United States Patent [19]
Elliott

[11] Patent Number: 5,448,117
[45] Date of Patent: Sep. 5, 1995

[54] STEPPER MOTOR

[75] Inventor: Hubert A. Elliott, Tequesta, Fla.

[73] Assignee: Consulier Engineering, Inc., Tequesta, Fla.

[21] Appl. No.: 22,457

[22] Filed: Feb. 25, 1993

[51] Int. Cl.⁶ ............... H02K 37/06; H02K 7/075
[52] U.S. Cl. .................. 310/49 R; 310/80; 310/82
[58] Field of Search ........... 310/49 R, 80, 82, 83; 318/696; 74/112, 116

[56] References Cited

U.S. PATENT DOCUMENTS

| | | | |
|---|---|---|---|
| 271,502 | 1/1883 | Millar | 310/82 |
| 455,711 | 6/1891 | Goode | 310/20 |
| 2,454,359 | 11/1948 | Vickers | 310/82 |
| 2,617,949 | 11/1952 | Leland | 310/20 |
| 2,866,910 | 12/1958 | Bentley | 310/20 |
| 3,018,665 | 1/1962 | Chrisoff | 310/20 |
| 3,148,319 | 9/1964 | Fredrickson | 310/49 R |
| 3,560,774 | 2/1971 | Reeves | 310/49 R |
| 3,770,997 | 11/1973 | Presley | 310/82 |
| 4,142,119 | 2/1979 | Madey | 310/82 |
| 4,498,032 | 2/1985 | Pinson | 310/49 R |
| 4,626,722 | 12/1986 | Fukui | 310/82 |
| 4,914,330 | 4/1990 | Pierrat | 310/82 |

FOREIGN PATENT DOCUMENTS

| | | | |
|---|---|---|---|
| 1084060 | 6/1960 | Germany | 310/49 R |
| 2656191 | 6/1978 | Germany | 310/82 |
| 1-231650 | 9/1989 | Japan | 310/49 R |

*Primary Examiner*—Clayton E. LaBalle

[57] ABSTRACT

A stepper motor includes a stator with magnetic poles extending radially outward from a central core to form segments of an outer stator surface, an armature ring fitting loosely over the stator, and a rotor with a drive plate rotationally driven by rollers extending from the armature ring into apertures in the drive plate. Current is supplied, according to a sequence, through coils surrounding each magnetic pole, so that the armature ring, being sequentially attracted to adjacent magnetic poles, moves around the stator with a modified orbital motion including an orbital motion, in which the ring is translated around a circular path, and a rotational motion. The stepper motor may also include a stationary cam plate with a number of peripheral notches, into which the rollers are moved individually by the orbital motion.

24 Claims, 4 Drawing Sheets

STEPPER MOTOR

BACKGROUND OF THE INVENTION

1. Field of the Invention

This invention relates to stepper motors, and more particularly, to stepper motors in which the motion of an armature closing a gap against a pole of an electromagnet is transferred by mechanical means into a cumulative rotational output.

2. Background Information

Stepper motors are electromechanical devices having a rotor driven in discrete steps by the application of electrical current to various coils. In this way, a stepper motor may be driven through multiple revolutions or through a fraction of a revolution. Generally, the sustained application of current to one or more selected coils results in the rotor being held in a fixed position, while the application of current to the coils in accordance with a specific sequence results in continuous rotation of the rotor.

One type of conventional stepper motor has a rotor, having a plurality of magnetic poles formed in permanent magnets, rotating within a stator, having a number of electromagnetic coils, which are pulsed in sequence to effect rotation of the rotor. One significant problem with the conventional stepper motor described above is the difficulty in stopping the stepper motor. This problem is a result of the fact that the coils are maintained in an energized condition to stop and hold the rotor at a predetermined angle and the resulting magnetic field tends to act as a spring system attached to the rotor. The result is an overshoot condition and subsequent vibrations caused by the inertia of the rotor and of the driven load.

The above problems associated with the dynamic response may be alleviated through the use of complex circuitry to slow the motor before stopping. Alternately, the problems may be overcome by designing a completely different type of stepper motor, in which rotation of the rotor is effected by the closure of an armature to the pole of an electromagnet and a separate mechanism is provided to transfer the armature motion into rotation of the rotor.

DESCRIPTION OF THE PRIOR ART

The patent art includes a number of descriptions of devices in which the motion of an armature, closing an air gap with an electromagnet is transferred, in a cumulative manner, into the rotation of a rotor. For example, U.S. Pat. No. 2,617,949 to Leland describes a cup shaped electromagnet, with an annular coil that pulls inward an armature mounted by means of a shaft to allow sliding and rotation. A plate attached to the armature has an annular ball race and the adjacent wall covering the coil includes an undulating annular surface. Balls roll on the surface, within the race and within a rotatably mounted spacer, causing a rotational impulse to be imparted to the armature as current flows through the electromagnetic, with the balls moving inward along inclined portions of the undulating surface. The rotational momentum thereby developed carries the balls to the next inclined surfaces. The electromagnet is energized intermittently, through a contact operated by rotation of the armature, to maintain continuous rotation.

There are several inadequacies with the Leland motor. For example, the Leland motor cannot be stopped at various selected positions. On the contrary, if it is stopped for any reason with the balls adjacently disposed from the inward most portions of the undulations, the armature must be manually positioned so that the balls are near the beginning of the ramp portions of the undulating surfaces before the magnet is energized. Further, the Leland motor is only unidirectional.

U.S. Pat. No. 2,866,910 to Bentley describes a stepper motor having a rotary solenoid mechanism at each end. Each rotary solenoid includes an annular coil moving an armature inward along a longitudinal axis of the motor. Balls, operating in inclined grooves within a plate attached to the armature, are used to translate the inward motion of the armature into rotary motion. Each rotary solenoid mechanism drives a single output shaft, extending longitudinally through the motor, by means of a pawl mechanism operating on a sprocket wheel centrally mounted on the output shaft. The rotary solenoid mechanisms at each end of the motor are similar, each being devoted to driving the single drive shaft in one of the two directions. Providing a current pulse to the magnet of one of the rotary solenoids rotates the output shaft through an incremental angle, while pulsing the solenoid at an appropriate rate results in a nearly continuous rotation.

U.S. Pat. No. 4,498,032 to Pinson describes a stepper motor having three push rods extending radially and inwardly to make contact with an undulating peripheral cam surface. The push rods may be driven by solenoids or by fluid motors. At the end of each step, one of the push rods is fully extended and in contact with the bottom of a valley region of the cam surface, a second push rod is in a partially extended position against a sloping surface between a peak and a valley, and a third push rod is in a partially extended position against an oppositely sloping surface between a peak and a valley. With Pinson's structure, the cam is driven forward to the next step by withdrawing the fully extended push rod and by fully extending one of the partially extended push rods, or the cam can be driven to the next step in the opposite direction by withdrawing the fully extended push rod and by fully extending the other of the partially extended push rods.

For providing a high resolution positioning device, the devices of Bentley and Pinson are limited by the relationship between the stepping angle and the discrete features of the surface being driven within the motor. In the Bentley device the step cannot be smaller than the angular distance between teeth on the sprocket wheel and in the Pinson device the step must be equal to half the angular distance between valleys in the undulating cam periphery. Since the mechanisms defining the angular distance cannot be made arbitrarily small while adequate strength is retained, a design is needed for a stepper motor in which the resolution is improved by providing steps much smaller than the distance between discrete features of a driven component.

U.S. Pat. No. 4,914,330 to Pierrat describes a stepper motor in which a trochoidal speed reduction mechanism forms an integral part of the stator and rotor, so that a low speed, high torque output is produced without having any high speed rotating component in the motor. The rotor has an epitrochoidal contour with a predetermined number of lobes. Positioned around the rotor are two non-rotating orbiting stator rings, phased 180 degrees apart, each provided with a number of rollers equal to the number of lobes on the rotor, plus one. To permit each stator ring to orbit, while restricting it from rotation, it is provided with two diametrically opposed protrusions, each extending into a slot in a torque transfer plate. The torque transfer plate, in turn, is allowed to slide on the motor housing perpendicular to the direction of motion in which the stator ring slides on the torque transfer plate. The rollers are rotatably mounted on the inner surface of the stator ring and are in continuous contact with the epitrochoidal contour of the shaft rotor. The non-rotating orbital movement of the stator rings is produced by magnetic forces from a series of stator windings arranged as magnetic poles around the stator rings. This action causes the rotor to rotate at a speed equal to the orbiting speed of the stator rings, divided by the built in speed reduction ratio.

The torque which can be produced by the Pierrat device is limited by the fact that the conversion between radial motion of the stator ring and rotational motion of the rotor occurs near the center of the motor. Thus, the relatively small available moment arm limits the output torque which can be achieved through the use of the force generated within the device. Furthermore, the efficiency of the Pierrat device is limited by the power lost in sliding motions which must occur under force loaded conditions during operation of the device. For example, each stator ring must slide on a torque transfer plate, and the torque plate must, in turn, slide in the motor housing. While the rollers are rotatably mounted in sockets, smaller diameter axles are not provided to reduce the torque required for their rotation.

To overcome the limitations of the Pierrat device, a drive configuration is needed in which the conversion of radial to rotational motion occurs near the outer surface of the motor. Further, a way to eliminate the need for preventing rotation of the stator rings, together with a way to provide rollers allowed to turn on axles of relatively small diameter is also needed.

SUMMARY OF THE INVENTION

In accordance with one aspect of the invention, there is provided a stepper motor having a stator assembly, including a plurality of magnetic poles extending radially outward from a central core to positions along an outer stator path. The stator assembly further includes a plurality of selectively engerizable coils, each coil being juxtaposed with a magnetic pole to generate a magnetic field when energized. The motor also has an armature ring around the stator assembly, the armature ring having an inner ring path greater than the outer stator path so that the armature ring moves around the stator assembly with simultaneous rotational motion and orbital motion as the coils are sequentially energized. Finally the motor has a rotatably mounted drive shaft and motion transfer means for transferring the motion of the armature ring to rotationally drive the drive shaft.

BRIEF DESCRIPTION OF THE DRAWINGS

Preferred embodiments of the subject invention are hereafter described with specific reference being made to the following Figures, in which.

DETAILED DESCRIPTION

Figure 1:
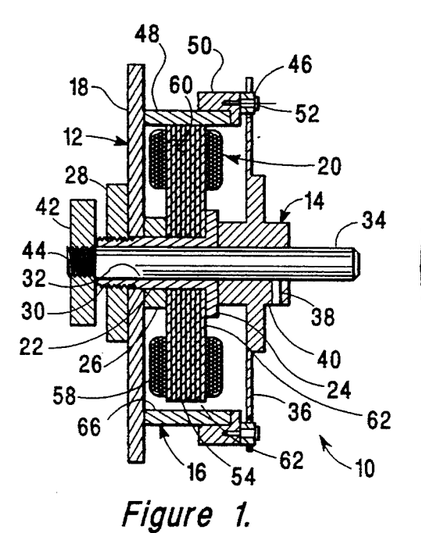
FIG. 1 is a longitudinal cross-sectional view of a stepper motor built in accordance with a first embodiment of the present invention.
Figure 2:
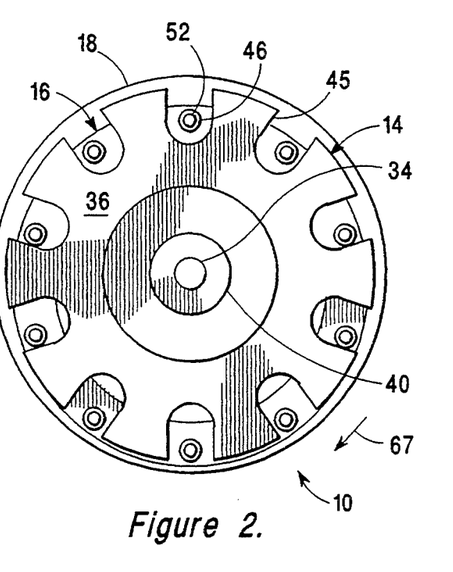
FIG. 2 is an end elevational view of the stepper motor of FIG. 1.
Figure 3:
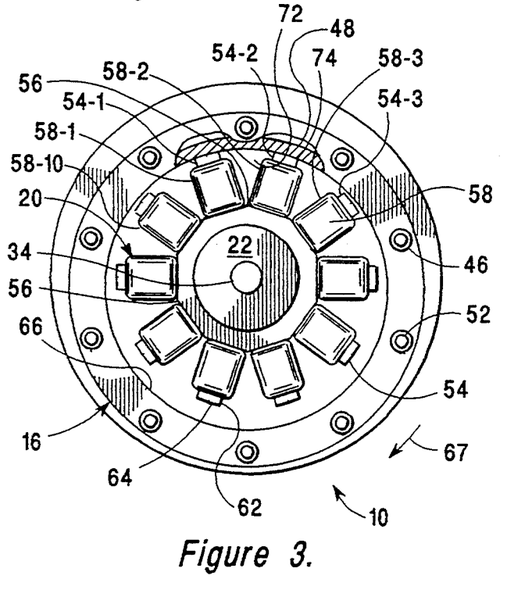
FIG. 3 is an end elevational view of the stepper motor of FIG. 1, with a drive plate removed to reveal internal details.

FIGS. 1 through 3 show a stepper motor 10, built in accordance with one preferred embodiment of the subject invention. Motor 10 includes a stator 12, a rotor 14, and an orbiting ring 16. Referring specifically to FIG. 1, stator 12 includes a base plate 18, which may be fastened to mounting brackets (not shown) or a framework (not shown) for holding the motor in the desired place. Stator 12 also includes a magnetic assembly 20 and a central bushing 22. Magnetic assembly 20 is clamped on central bushing 22, between bushing flange 24 and a spacer 26, by means of a clamping nut 28 engaging a threaded end portion 30 of bushing 22.

Bushing 22 also provides a central hole 32 in which drive shaft 34 of rotor 14 is rotatably mounted. At one end of stepper motor 10, a drive plate 36 is securely fastened to drive shaft 34 by conventional means, such as a pin 38 extending through drive plate hub 40. A second clamping nut 42 is fastened to a threaded end 44 of drive shaft 34, opposite drive plate 36, holding the shaft in place on bushing 22, while allowing the shaft to rotate within the bushing.

As shown in FIG. 2, the periphery of drive plate 36 includes a number of inward extending apertures 45, which are used to transfer rotational movement to drive shaft 34 from a number of rollers 46 extending outwardly from orbiting ring 16. Referring also to FIG. 1, orbiting ring 16 includes an armature ring 48 and a drive ring 50, from which flanged pins 52 extend on which rollers 46 are rotatably mounted. Armature ring 48 and drive ring 50 are pressed or otherwise fastened together. Orbiting ring 16 is mounted to turn loosely on magnetic assembly 20, being axially constrained between base plate 18 and drive plate 36.

Referring now to FIG. 3, magnetic assembly 20 includes a number of poles 54 extending radially from a central core 56. Each pole 54 includes a coil 58, placed around an outward extending section 60 of a magnetic iron structure 62. Magnetic iron structure 62, poles 54 and core 56, are preferably composed of a laminated stack of flat plates of magnetic material having a low magnetic retentivity, such as soft magnetic iron or other magnetic materials. Armature ring 48 is preferably composed of tubular magnetic material having a low magnetic retentivity. Adjacent structures are preferably composed of non-magnetic materials, such as austenitic stainless steel, aluminum, or plastic resins. The application of an electrical current to a coil 58 causes the production of magnetic flux in section 60 extending outward through the coil 58. The outer surface 64 of magnetic iron structure 62 is formed as interrupted portions of a cylinder having a smaller diameter than inner surface 66 of armature ring 48.

While orbiting ring 16 is mounted loosely to move on magnetic assembly 20, electrical currents may be applied in a sequential manner within the various coils 58 to provide a specific motion, which is a combination of orbital motion and rotational motion, to orbiting ring 16.

Adjacent electrical coils 58 are constructed so that the magnetic flux produced within the outward extending sections 60 of adjacent poles 54 are opposite in polarity. Motor 10 is constructed with an even number of poles 54, so that the polarity relationship can be achieved without switching the polarity of individual poles. Thus, when electrical current is applied to two adjacent coils 58-1 and 58-2, a magnetic flux is established within a path including pole 54-1 of coil 58-1, the portion of armature ring 48 between poles 54-1 and 54-2, the pole 54-2 of coil 58-2, and the portion of central core 56 between these two poles.

The generation of magnetic flux in the described path results in the induction of magnetic poles having opposite polarity on each side of the air gap between the poles 54-1 and 54-2 and the adjacent portions of armature ring 48. The magnetic poles, in turn, result in the development of a strong magnetic attractive force between poles 54-1 and 54-2 and the adjacent part of armature ring 48. The magnetic force pulls that adjacent part of armature ring 48 against those poles, such as poles 54-1 and 54-2, which have been energized, with inner surface 66 of armature ring 48 being held against the portion of outer surface 64 forming the ends of poles 54-1 and 54-2. The holding remains as long as the current is applied to coils 58-1 and 58-2.

FIG. 3 shows orbiting ring 16 in the position in which it is held by the application of current through coils 58-1 and 58-2. The position at which inner surface 66 of armature ring 48 is held against outer surface 64 of magnetic iron structure 62 is varied by applying electrical current through different coils 58. In accordance with a preferred embodiment of this invention, whenever drive shaft 34 is to be rotationally driven or held in place, electrical current is applied through two adjacent coils 58.

Figure 4:
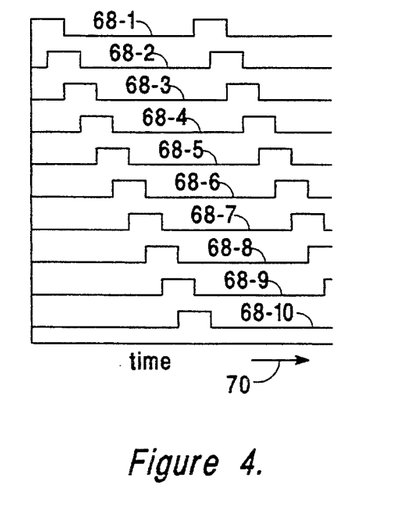
FIG. 4 is a timing diagram showing the application of electrical current to the coils of the stepper motor of FIG. 1.

FIG. 4 is a timing diagram showing the application of electrical current within the various coils of magnetic assembly 20 to produce the rotation of drive shaft 34. Each plotted line of FIG. 4 represents the current applied through one of the coils, with line 68-1 representing the current applied through coil 58-1, line 68-2 represents the current applied through coil 58-2, and so forth, against a time line established in the direction of arrow 70. It should be understood that the waveshapes in FIG. 4 are schematic, as it is impossible to drive a square wave through an inductance. Current rise times and fall times must be associated with the characteristics of the coils and with the circuits used to drive the coils. Furthermore, variations in the current profiles may be used to optimize the performance of a specific motor design in a particular application.

Referring again to FIG. 3, the interruption of current through coil 58-1, together with the application of current through coil 58-3, while the flow of current through coil 58-2 is maintained, results in a rocking movement of orbiting ring 16 on pole 54-2, in which the air gap between pole 54-3 and armature ring 48 is closed, while a mirror image of the gap is opened between pole 54-1 and armature ring 48. This process is continued, sequencing the flow of current through the coils 58-1 through 58-10, and repeating the sequence shown in FIG. 4.

Orbiting ring 16 is thus moved in a modified orbital motion among a number of stable positions, with the number of stable positions being equal to the number of poles 54. For example, orbiting ring 16 is shown in a stable position with inner surface of 66 of armature ring 48 held against outer surface 64 of poles 54-1 and 54-2. In each stable position, the inner surface 66 of armature ring 48 is held against two adjacent poles 54. In the example of FIGS. 3 and 4, ten stable positions are provided by the use of ten poles 58. Thus, a point 72 on inner surface 66 of armature ring 48, midway between the two poles 54-1 and 54-2 through which current is flowing, is moved inward, toward shaft 34, as far as possible. The sequential pulsing of adjacent coils 58, as shown in FIG. 4, sequentially moves points between adjacent poles inward, proceeding in a circular pattern around magnetic iron structure 62.

A rotational movement of orbiting ring 16 also occurs along with the sequential rocking movement described above since ring 48 is a part of ring 16. During each rocking movement, in the absence of a load torque sufficient to overcome frictional forces within motor 10, rotation without slippage occurs about an edge of a pole 54. For example, when current through coil 58-1 is interrupted as the flow of current is started through coil 58-3 and maintained through coil 58-2, orbiting ring 16 rotates about an edge 74 of pole 54-2. Since inner surface 66 of armature ring 48 is greater in diameter than outer surface 64 of magnetic iron structure 62, the successive rocking motions occurring as orbiting ring 16 is moved from an initial stable position, in a circular manner between successively adjacent stable positions to return to the initial stable position, results in the rotation of orbiting ring 16. The rotation is such that a point on inner surface 66 of armature ring 48 is moved through a distance essentially equal to the difference between the circumference of surface 66 and the circumference of outer surface 64 of magnetic iron structure 62. Thus, when current is switched, as shown in FIG. 4, orbiting ring 16 is rotated in the direction of arrow 67 at a speed essentially equal to the orbital rate, multiplied by the ratio of the difference in the diameters of surfaces 66 and 64 to the diameter of surface 66. It should be noted that while it may be preferable to operate two coils 58 at the same time, this is not absolutely necessary, as rotation can be achieved by operating only one coil at a time in a sequential manner.

Referring again to FIG. 2, as well as to FIG. 3, the rotational component of the motion of orbiting ring 16 is transferred to rotational motion of drive shaft 34 by means of contact between the various rollers 46, rotatably mounted on ring 16, and apertures 45 in drive plate 36. One or more rollers 46, located at approximately a right angle around armature ring 48 from the point 72 held inward, is in contact with a surface of an associated aperture 45. Symmetrical alignment resulting in the simultaneous contact of more than one roller 46 with an aperture 45 will not occur because each roller 46 is at a different stage of its progression in traveling a circular path within the confines of its aperture 45 and only one stage of this progression places a roller 46 in a position to drive plate 36. Movement of orbiting ring 16 to the next stable position includes a rotational movement of the ring 16 with a roller 46 rolling in contact with the adjacent surface of an aperture 45. As the contacting roller 46 moves out of contact, another roller 46 comes into contact with another aperture 45. Since there is an overall rotational component to the motion of orbiting ring 16, an overall rotation is imparted to drive plate 36 by rollers 46 coming successively into contact with the surfaces of apertures 45. Alternatively, projections similar to rollers 46 may extend radially outward from ring 16 to radially inward facing apertures on drive wheel concentric with ring 16.

Figure 5:
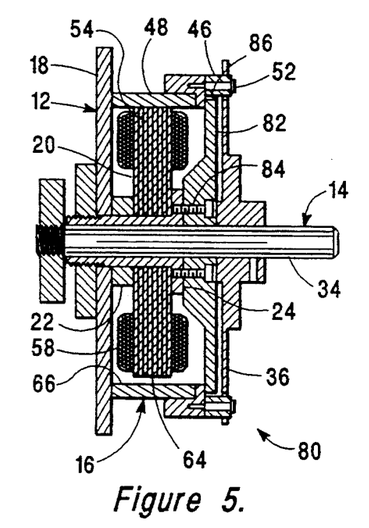
FIG. 5 is a longitudinal cross-sectional view of a stepper motor built in accordance with a second embodiment of the present invention.
Figure 6:
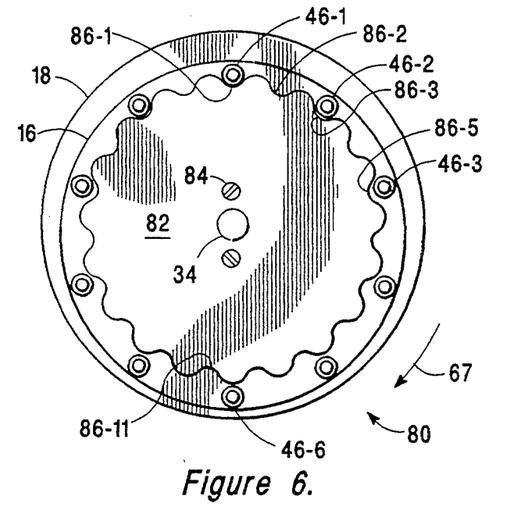
FIG. 6 is an end elevational view of the stepper motor of FIG. 6, with a drive plate removed to reveal a cam plate.

Referring now to FIGS. 5 and 6, a stepper motor 80 is shown. Stepper motor 80 is an example of a second embodiment of the present invention, with parts having functions similar to those of parts in the stepper motor 10 being indicated by common reference numerals.

Referring first to FIG. 5, which provides a longitudinal cross-sectional elevation of stepper motor 80, a cam plate 82 is added within the previously described configuration of stepper motor 10. Cam plate 82 forms a part of stator 12, being fastened in place by screws 84 extending into central bushing 22. Rollers 46, and the flanged pins 52 on which they are mounted, are elongated to extend through notches 86 in the peripheral surface of cam plate 82. Orbiting ring 16 is otherwise as described with reference to FIGS. 1 to 3. Magnetic assembly 20 is also as previously described. Rotor 14, including drive shaft 34 and drive plate 36, is also as described, except for modifications to accommodate the positioning of cam plate 82 within the motor.

FIG. 6 provides an elevational end view of stepper motor 80 with drive plate 36 (shown in FIG. 5) removed to reveal the peripheral shape of cam plate 82. A number of notches 86 in the periphery of plate 82 accept the various rollers 46 as they are driven inward, toward shaft 34, by the modified orbital motion of orbiting ring 16.

In the example shown, there are ten rollers 46 and nineteen notches 86. In the position shown, roller 46-1 is pulled into place in a notch 86-1, as current flows through adjacent coils 58 on each side of roller 46-1. The flow of current through the various coils 58 is then provided in sequence, as previously described with reference to FIGS. 3 and 4, establishing a modified orbital motion of orbiting ring 16. Roller 46-2 is pulled inward next, into a notch 86-3, as roller 46-1 is moved slightly outward. The inward motion aligns roller 46-2 with notch 86-3, moving orbiting ring 16 through a small angle in the direction of arrow 67.

The next orbital motion of ring 16 pulls roller 46-3 into notch 86-5, causing further rotation of ring 16 in the direction of arrow 67. The effects of these rotations are cumulative, so by the time roller 46-6 is pulled inward as far as possible, orbiting ring 16 is rotated far enough to be pulled easily into notch 86-11. When the cumulative rotation of ring 16 is equal to the angle between adjacent notches 86, pin 46-1 is pulled into notch 86-2.

At this point, the orbital motion has travelled through one revolution, plus the angle between adjacent notches; i.e. the orbital motion has travelled through twenty times the angle between adjacent notches. Therefore, the speed of rotation of orbiting ring 16 is one twentieth its orbital speed. The cumulative rotation of ring 16 is transferred into rotary motion by the operation of rollers 46 in slots 45 of drive plate 36, as previously discussed with reference to FIGS. 2 and 3.

The diameters of surfaces 64 and 66 are chosen so that the ratio between orbital and rotational motion of ring 16 due to the process described with reference to FIG. 3, i.e. of rocking motions without slippage between surfaces 64 and 66, is substantially equal to the ratio provided by the relationship between rollers 46 and notches 86. Thus, cam plate 82 functions as a guide to prevent slippage of orbiting ring 16 over cores 56. Also, orbiting ring 16 has a number of pins 46 equally spaced around a pitch circle, while cam plate 82 has peripheral notches 86, equally spaced around a pitch circle, equal in number to one less than twice the number of pins. Further, the distance between adjacent notches 86, along the pitch circle of cam plate 82 is essentially half the distance between adjacent pins 46, along the pitch circle of the ring 16.

Thus, the present invention has several advantages over the prior art device of U.S. Pat. No. 4,914,330 to Pierrat. In the present invention, orbiting ring 16 surrounds magnetic assembly 20, whereas, in the Pierrat device, an orbiting, non-rotating stator ring is surrounded by a magnetic stator assembly. Therefore, in the present invention, the modified orbital motion of the orbiting ring 16 is transferred to rotational motion of the drive shaft at points near the outside of the motor. This is advantageous over the Pierrat device, where the orbiting motion of the stator ring is transferred to rotational motion of the drive shaft at points close to the shaft. Thus, a much larger moment arm is available in the present invention for the conversion of force levels, developed through the use of internal electromagnets, into output torque levels.

Also, the type of motion developed within orbiting ring 16 of the present invention is significantly improved over the orbital motion developed within the stator ring of the Pierrat device. In the present invention, orbiting ring 16 rotates through a small angle, with each discrete movement being between stable positions. The rotation occurs as a natural result of the rolling movement of orbiting ring 16 on magnetic iron structure 62, with surfaces 64 and 66 in contact. Particularly with respect to motor 80 of the present invention, the rotation occurs as a natural result of the meshing engagement of rollers 46 in peripheral notches 86 of cam plate 82. On the other hand, in the Pierrat device, the rotation of a stator ring is prevented by mounting it to slide in a first direction on a torque transfer plate, which is itself mounted to slide perpendicularly to the first direction. The elimination of Pierrat's sliding motions results in increased efficiency within the present invention.

Furthermore, while rollers 46 of the present invention are allowed to turn on axles, minimizing frictional losses, the rollers of the Pierrat device are mounted to turn within sockets. It is, however, understood that the present invention is not limited to the use of rollers. Non-rotating cylindrical projections, or other projecting shapes, on the outside diameter of the orbiting ring 16 can also be used within the scope of the present invention.

Since in the example herein disclosed of a stepper motor (1) having ten stable positions at which the motion of orbiting ring 16, and hence rotor 14, can be stopped and (2) twenty orbital revolutions per rotor 14 revolution, there are 200 stable positions in each revolution of rotor 14. Stepper motor 80, thus, has a resolution, or output angle between stable positions of 1/200th of a circle, or 1.8 degrees.

Thus, the present invention has an important advantage over many devices within the prior art, in which the step distance, or resolution is limited by the angle between teeth, grooves, or similar locating features. For example, in the device of U.S. Pat. No. 2,866,910 to Bentley, the stepping distance is limited by the angle between teeth on the sprocket attached to the output shaft. In the device of U.S. Pat. No. 4,498,032 to Pinson, the stepping distance is half the angle between valleys in the undulating cam surface. Since such features cannot be made arbitrarily small while retaining satisfactory strength, the method of the present invention is provided with a comparative advantage in allowing small steps, or high resolution, in a relatively small device.

The various numbers of elements, such as poles 58, rollers 46, and apertures 45 are understood to be given only by way of example. These numbers can be varied greatly to meet the requirements of various applications into which the present invention may be placed. In general, increasing the number of poles 58 and rollers 46 increases the cost and complexity of the motor while improving the resolution of the device, since more stable positions per output revolution are provided. In addition, the provision of more stable positions decreases vibrations as the motor is driven through relatively large angles of rotation.

While motor 10 has the advantages of simplicity and lower cost, when compared to motor 80, the torque which can be provided by the motor 10 is limited by the occurrence of rotational slippage of orbiting ring 16 on magnetic iron structure 62. In configurations of similar size, motor 80 produces much greater torque through the interaction between rollers 46 and notches 86.

In both motors 10 and 80, a stationary peripheral stator interface is provided for engagement with orbiting ring 16. In motor 10, the interface surface is composed of the various magnetic pole peripheral surfaces 64. However, in motor 80, the interface surface includes the peripheral surface of cam plate 82, with its notches 86 engaging rollers 46, where contact between surfaces 64 and 66 is expected. Therefor, in motor 80, the rotational speed of orbiting ring 16, as developed through contact between surfaces 64 and 66 is preferably equal to the rotational speed developed through the engagement of notches 86 with rollers 46.

Figure 7:
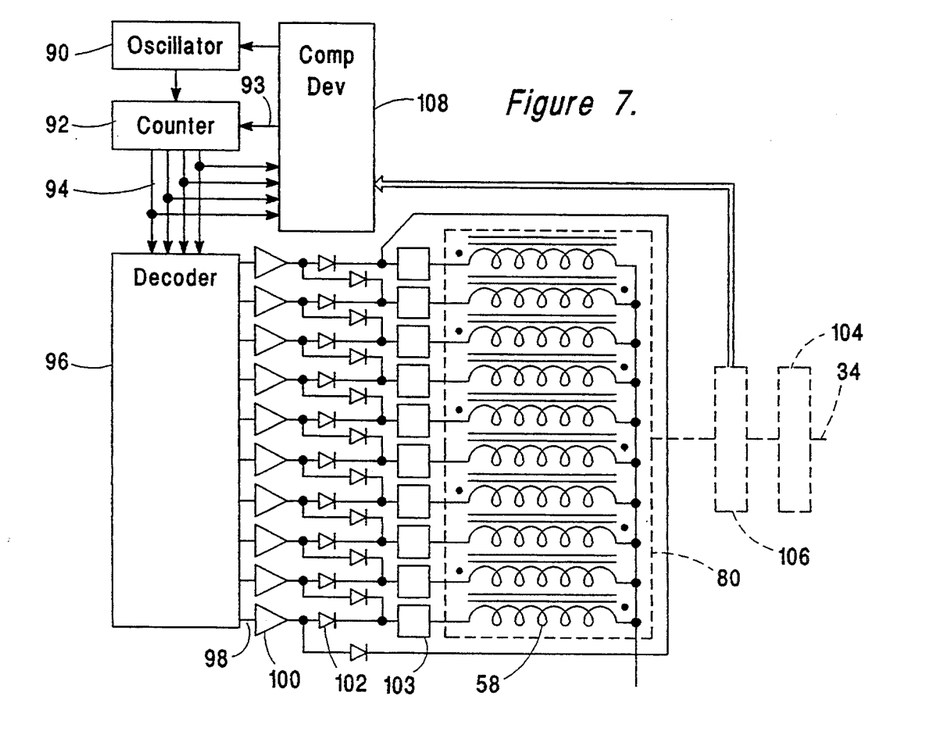
FIG. 7 is a diagram of a circuit for controlling the operation of the stepper motor of FIG. 1 or of FIG. 5.

A circuit for driving either stepper motor 10 or 80 is shown schematically in FIG. 7. An oscillator 90 provides pulses to be counted by a binary coded decimal counter 92, which, in turn, provides a binary coded decimal output on four lines 94 to a decoder 96. Decoder 96, in turn, decodes the output from counter 92, providing a pulse on one of the ten lines 98 therefrom, with only one pulse beginning at a time, in sequence. An amplifier 100 amplifies the pulse signal provided on each line 98, and an array of diodes 102 distributes the output of each amplifier circuit 100 so that inputs are provided to two adjacent magnet driver circuits 103 at once. Each magnet driver circuit 103 in turn drives an associated coil 58 in motor 10 or 80. Thus, the current profile discussed with reference to FIG. 4 is generated. As counter 92 completes its count, it returns to a count of zero and begins anew, so continued rotational output of the motor is achieved, at a speed determined by the frequency of the pulses delivered by oscillator 90.

In many applications, a stepper motor is used to precisely position a load, indicated in FIG. 7 as load 104 on motor shaft 34. An emitter 106 may be used to provide feedback signals to a computing device 108 manifesting the location of load 104. Emitter 106 may, for example, provide an output of coded numbers representing the angular position of shaft 34. These numbers may be used within computing device 108 to determine when the rotation of motor 80 should be stopped to position load 104 in a predetermined location. The numbers generated by counter 92 are also provided to computing device 108, where they may be compared to a predetermined number used for precise stopping.

The rotation of motor output shaft 34 may be stopped by merely stopping pulses from oscillator 90 under control of computing device 108. Upon stoppage, a numeric count remains in counter 92, so that one of the decoder output lines 98 remains active, maintaining the flow of current through two adjacent motor coils 58. Thus, as seen in FIG. 5, inner armature surface 66 is held against outer magnetic iron structure surface 64 at the locations of the two adjacent poles 54 being energized by the flow of current.

As shown in FIG. 3, the air gap between the energized poles 54-1 and 54-2 and the adjacent portion of armature ring 48 is virtually non-existent, thereby producing maximum magnetic flux, and hence maximum attractive forces, between energized poles 54-1 and 54-2 and armature ring 48. These attractive forces are available to provide a braking torque to hold a load in place after stopping, as well as to move armature ring 48 as described above. In many applications, the torque available to hold a load in place after stopping is an important consideration. The high braking torque which can be achieved in motors 10 and 80 provides the present invention with a significant advantage over many other devices, such as conventional stepper motors, in which a significant air gap is maintained between the rotor and the stator as the device is stopped.

Motor 80, has one advantage over motor 10 in that the braking torque of motor 80 is not limited by the frictional torque developed between orbiting ring 16 and the energized magnetic poles 54. With motor 80, slippage within motor 80 in the stopped condition requires that one of the rollers 46 (shown in FIG. 6) must be forced outward from the notch 86 in which it is held by the magnetic forces operating on orbiting ring 16.

The manner of stopping either motor 10 or 80, as explained above, is particularly advantageous over the manner of stopping a conventional stepper motor. In the conventional stepper motor, stopping occurs by bringing the rotor into an angular position in which the alignment of magnetic fields tends to prevent rotation. Under these conditions, the magnetic field tends to act as a spring system, with an overshoot condition and subsequent vibrations being caused by the inertia of the rotor and driven load.

In many applications, the available level of braking torque is not required. The current through two adjacent coils 58 holding motor 80 in a stable position may therefore be reduced after the motor is stopped, or the current through one of these coils may be turned off as the motor is held in the stopped condition.

Motor 10 or motor 80 can be made to provide a rotary output in the opposite direction, i.e. in the direction opposite to arrow 67, by applying currents through coils 58 in a sequence opposite to the sequence discussed above with reference to FIGS. 3 and 4. In other words, starting from a stable position with coils 58-3 and 58-2 energized, the flow of current through coil 58-3 is terminated while the flow of current through coil 58-1 is begun. Referring again to FIG. 7, counter 92 includes a decrement input 93 which allows the counting direction to be reversed, from ascending to descending numeric order, under control of computing device 108. The decrement input 93 is, thus, used to control the direction of rotation of motor 80, so that motor 80 may be used to position a load precisely, rotating in either direction through small and large increments.

Typically, during the time stepper motor 80 is used as a positioning device, current is maintained through at least one coil 58, and preferably two adjacent coils 58. Thus, a braking torque is maintained, and armature ring 48 is held against at least one of the two adjacent poles 54 which must be energized to begin the next rotation in either direction.

If the flow of electrical current is stopped, orbiting ring 16 may be moved by external forces operating together as a load applied to the stationary motor 10 or 80. For example, such forces may result from the effects of gravity and vibrations from external sources to ring 16. Such forces may move armature ring 48 so far away from the particular poles 54 that the application of current at these particular poles does not move ring 48 back into contact with the original adjacent poles 54 when those adjacent poles 54 are subsequently energized to restart motor 10 or 80.

The inability to immediately restart motor 10 or 80 occurs because the force developed by the magnetic field is greatly diminished as the air gap distances between the energized poles 54 and armature ring 48 are increased. The solution to the restart problem is to continue sequential pulsing of the coils 58 until a pole is energized at a point where a smaller air gap is maintained between a portion of armature ring 48 and the pole. When such a pole is energized, the armature ring is pulled inward, and the rotation of motor 80 begins with subsequent sequential pulsing.

Thus, in the event of a cold start, without continued application of a current to provide a braking torque after the previous time motor 80 was stopped, there may be a short time delay as coils 58 are pulsed, before the rotational output of motor 10 or 80 is begun. However, this disadvantage can be overcome, in most applications requiring immediate response or precise positioning by maintaining an appropriate current holding armature ring 48 in place as motor 10 or 80 is stopped. Further, an advantage is gained in that it is not necessary to determine the location of armature ring 48 before determining which coil 58 is to be pulsed. Thus, operation of motor 10 or 80 can be achieved without the use of brushes or location sensing transducers. Nevertheless, some applications will require the use of a location sensing transducer, such as emitter 106, to determine the position of the load being driven.

The design of armature ring 48 of the present invention provides a significant advantage over the armature and plate design described in U.S. Pat. No. 2,617,949 to Leland, which requires the use of manual positioning or of separate, undisclosed positioning means, in the event that the armature is stopped by any means in a location in which sliding the armature does not cause rotation.

Figure 8:
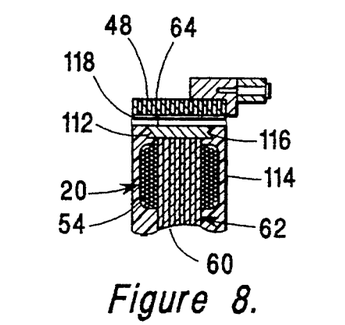
FIG. 8 is a partial longitudinal cross-sectional view of an alternative pole piece of a stepper motor build in accordance with the present invention, showing features which may be employed in the construction of the motor.

FIG. 8 shows alternative features which may be employed in the construction of pole 54 and armature ring 48. In FIG. 8, elements having similar functions to elements previously discussed are identified by common reference numerals. As previously discussed, magnetic assembly 62 is preferably constructed from laminated sheets of a magnetic material with low magnetic retentivity, such as soft magnetic iron. Alternatively, a cap 112, composed of magnetic material, may be placed over the outer facing end of pole 54. Cap 112 may slightly overextend the end face of pole 54 in the circumferential directions in order to provide a more efficient path for fringing magnetic fields from pole 54 into the gap between pole 54 and armature ring 48.

After the completion of the assembly processes necessary to build magnetic assembly 20, the fabrication and assembly of cap 112 may be facilitated by surrounding magnetic assembly 20 with a resinous material 114, such as an epoxy resin. Grooves 116, included in edges of cap 112, facilitate attachment between resinous material 114 and cap 112. Machining operations to provide a properly aligned cylindrical outer surface 64 of cap 112 may occur after resinous material 114 has cured.

While armature ring 48 has previously been described as an integral hollow cylinder, it may alternately be formed using a laminated stack of sheets of magnetic iron. A thin coating 118 may be applied to the inner surface of ring 48 or to the outer surface 64 of magnetic iron structure 62 to reduce the sound caused by closing the gap between ring 48 and structure 62. Coating 118 may also or alternately increase the frictional torque which can be developed between surface 64 and armature ring 48.

Figure 9:
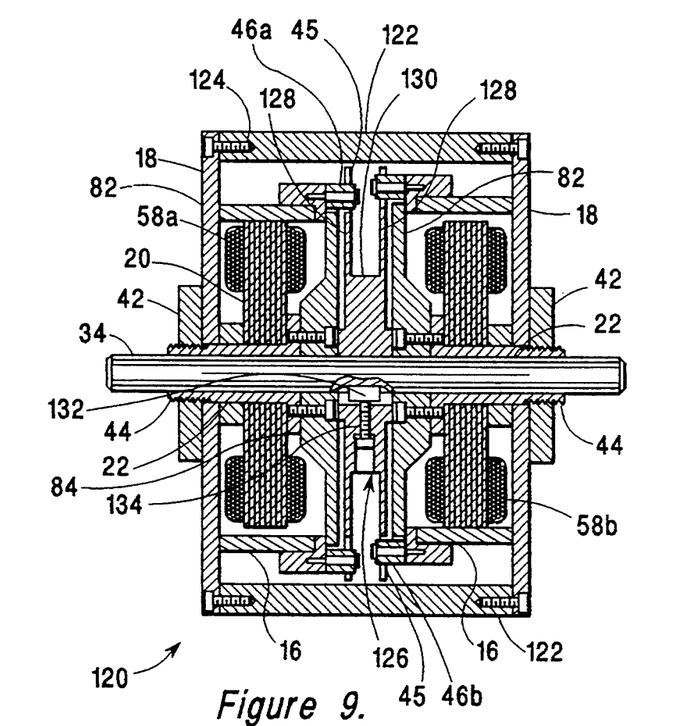
FIG. 9 is a longitudinal cross-sectional view of a duplex embodiment of a stepper motor built in accordance with the present invention.
Figure 10:
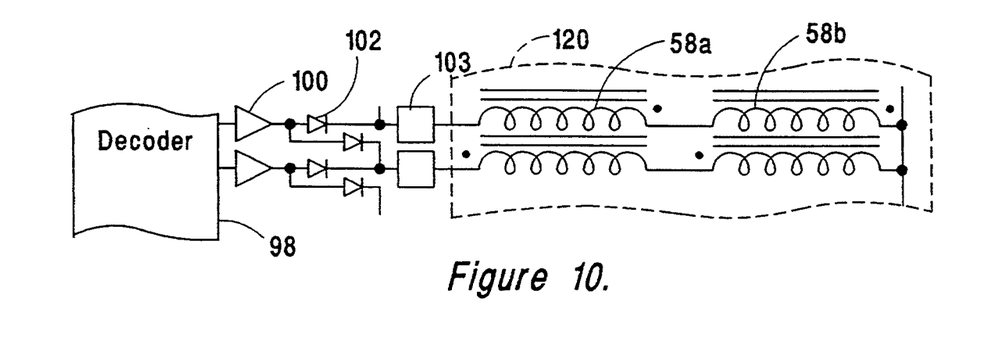
FIG. 10 is a partial diagram of a circuit for controlling the operation of the stepper motor of FIG. 9.
Figure 11:
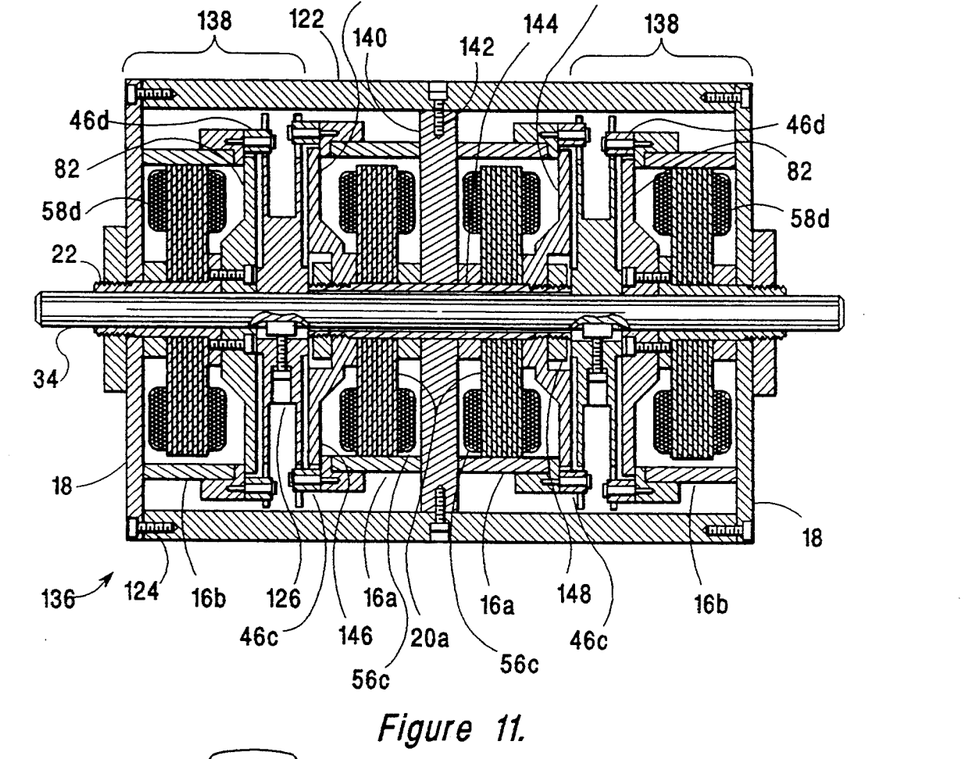
FIG. 11 is a longitudinal cross-sectional view of a quadriplex embodiment of a stepper motor built in accordance with the present invention.

FIGS. 9 through 11 show embodiments of the present invention in which multiple orbiting rings 16 are used to transmit drive torque to a single drive shaft 34. Again, elements with similar function to those previously described are identified by common reference numerals. The use of multiple orbiting rings 16 can be used to eliminate or minimize reaction forces and torques, allowing operation at a reduced level of vibration for the desired rotational speed.

FIG. 9 is a longitudinal cross-sectional view of a duplex stepper motor 120, in which a pair of orbiting rings 16 are arranged to transmit rotation to a single drive shaft 34. A pair of base plates 18 are held in a spaced apart relationship by an outer cylinder 122, to which plates 18 are fastened by means of a number of screws 124. Drive shaft 34 is rotatably mounted in a pair of bushings 22 extending inward from each base plate 18. One magnetic assembly 20 is clamped on each bushing 22, by a nut 42 engaging a threaded end 44 of each bushing 22. A stationary cam plate 82 is fastened to each bushing 22 by means of screws 84.

Each cam plate 82 preferably has the peripheral notch profile, discussed above with reference to FIG. 6. In motor 120, the notch profiles of the two cam plates 82 are angularly displaced, one from the other, by an angle equal to half the angle between the centers of adjacent notches 86 or near that angle to improve torque output. Thus, diametrically opposite rollers 46a and 46b, of the two orbiting rings 16, are allowed to be pulled inward simultaneously.

A dual drive plate 126 includes a pair of annular plates 128, one extending radially outward from each end of a central hub 130. Each plate 128 includes a number of notches 45, as described previously with reference to FIG. 2, with notches 45 in the two sections 128 being preferably aligned with one another. Dual drive plate 126 is fastened to shaft 34 by means of a key 132, extending through slots in the shaft and in central hub 130, being held in place with a setscrew 134.

In a preferred version of motor 120, the two orbiting rings 16 are coupled to translate oppositely while rotating in unison, that is, diametrically opposite rollers 46a and 46b of the two rings are simultaneously pulled inward as far as possible. In this way, the reaction forces developed within motor 120 are effectively balanced, or cancelled. Furthermore, in a preferred version of this invention, the coupled motion is driven by electrical means, as diametrically opposite coils 58a and 58b of magnetic assemblies 20 are simultaneously energized.

FIG. 10 shows a portion of a circuit, which is a modification to FIG. 7, providing the necessary electrical coupling. As previously described with reference to FIG. 7, a number of magnet drivers 103 are driven by decoder 98 through amplifiers 100 and diodes 102. The output of each magnet driver 103 is in turn connected to diametrically opposite coils 58a and 58b of motor 120. While the FIG. 10 circuit requires a higher operating voltage for each driver circuit 103, it has the advantage of assuring that the same current is supplied through diametrically opposite coils.

FIG. 11 is a longitudinal cross-sectional view of a quadriplex embodiment of the present invention, in the form of a motor 136 having four orbiting rings 16. An outer section 138 at each end of motor 136 is similar to the corresponding end of motor 120, providing an inward extending bushing 22 in which drive shaft 34 turns. Dual drive plate 126 is as described above with reference to FIG. 9. Two outer base plates 18 are fastened together in a spaced apart relationship by means of screws 124 engaging an outer cylinder 122. A central base plate 140, fastened within cylinder 122 by means of screws 142, supports a central support tube 144, extending around shaft 34. Central cam plates 146 are fastened onto support tube 144 by means of nuts 148, as central magnetic assemblies 20a are also clamped in place on tube 144.

Central cam plates 146 are rotationally aligned with each other, so that diametrically aligned central rollers 46c may be pulled inward as far as possible simultaneously. End cam plates 82 are also rotationally aligned, so that diametrically aligned end rollers 46d may be pulled inward as far as possible simultaneously. In motor 136, notch profiles of the central cam plates 82 are angularly displaced from notch profiles of end cam plates 82 by an angle equal to half the angle between the centers of adjacent notches 86, so that diametrically opposite central rollers 46c and end rollers 46d are allowed to be pulled inward simultaneously. Alternatively, a combination of cam plate alignments may be used to provide a more uniform torque output.

It is desirable to drive the two central orbiting rings 16a together, in a radial direction opposite to the direction of radial motion of outer orbiting rings 16b. This can be accomplished by wiring diametrically aligned central coils 58c to be activated simultaneously with end coils 58d both diametrically opposite central coils 58c. For example, four coils may be wired in series, to be driven by each magnet driver 103 of FIG. 9. Motor 136 has the advantage, over both motor 120 of FIG. 9 and the device of U.S. Pat. No. 4,914,330 to Pierrat, of balancing reaction torques, as well as reaction forces, during the operation of the motor.

While the motors 120 and 136 discussed with reference to FIGS. 9 and 11 are versions of the motor 80, including stationary cam plates 82 and 146, it should be understood that such versions of the motor 10 could be as easily implemented, with multiple orbiting rings 16 driving a single shaft 34 in a similar manner.

Figure 12:
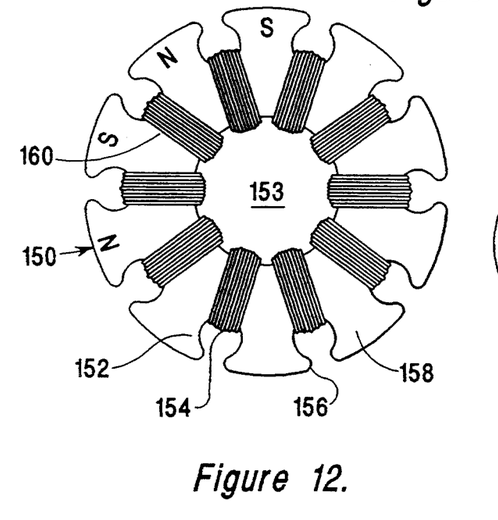
FIGS. 12 and 13 show views of alternate versions of the magnetic assembly of the stepper motor.
Figure 13:
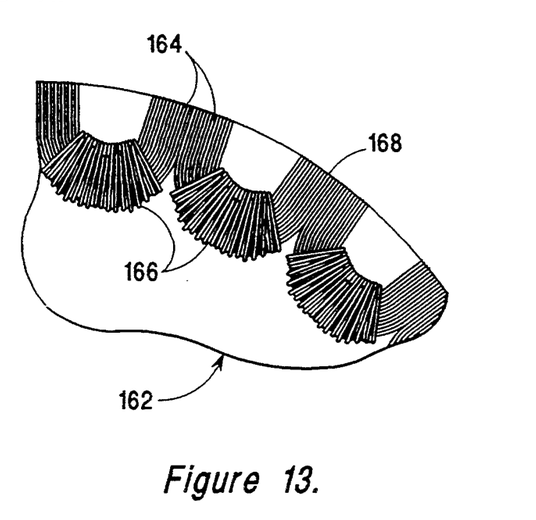

Referring to FIGS. 12 and 13, alternate versions to magnetic assembly 20 are shown. In FIG. 12, a magnetic assembly 150 is shown and has particular adaptability for small motors. Magnetic assembly 150 includes a circular plate 152 having an open center 153 and a plurality of small circular openings 154 spaced slightly from the periphery of plate 152. Each small opening 154 may have a diameter approximately one half of the distance from the periphery of plate 152 to opening 153. A slot 156 is placed radially from the periphery of plate 152 to each opening, thereby separating the periphery of plate 152 into plural poles 158. A coil 160 is wound from the inner peripheral edge of each small opening 154 to the outer peripheral edge of opening 153 and current is applied through each adjacent coils 160 in opposite directions to cause alternating north and south poles to exist on adjacent poles 158. Additional structure (not shown), such a potting material or a bracket affixed to plate 152 surrounding opening 153, is provided to affix magnetic assembly 150 to the remaining structure of one of the motors 10, 80, 120 or 136.

In FIG. 13, a magnetic assembly 162 is shown and has particular adaptability for larger motors. Magnetic assembly 162 has a plurality of U shaped elements 164 physically coupled together to form a circle. A coil 166 is wound around the closed, or curved, portion of each U shaped element 164 and current is applied through adjacent coils 166 in opposite directions to cause alternating north and south poles to exist on coupled legs of elements 164. Thus, each pair of coupled legs represents a pole 168 of the magnetic assembly 162. Additional structure (not shown), such as a potting material, may be used to maintain each of the U shaped elements 164 in position and to permit affixation of magnetic assembly 162 to the remaining structure of one of the motors 10, 80, 120 or 136. In addition, the peripheral ends of the poles 168 may be machined to form a circular shape for magnetic assembly 162.

What is claimed is:

1. A stepper motor comprising:
   a stator assembly, including a plurality of magnetic poles extending radially outward from a central core to positions along an outer stator path, and a plurality of selectively engerizable coils, each coil being juxtaposed with a magnetic pole to generate a magnetic field when energized;
   an armature ring around said stator assembly, having an inner ring path greater than said outer stator path so that said armature ring moves around said stator assembly with simultaneous rotational motion and orbital motion as said coils are sequentially energized;
   a rotatably mounted drive shaft; and motion transfer means for transferring the motion of said armature ring to rotationally drive said drive shaft including a drive plate mounted to turn with said drive shaft, said drive plate including a plurality of apertures; and a plurality of projections from said armature ring, each projection extending individually into an aperture, said apertures being sized to permit said orbital motion within said apertures, and a stationary cam plate engaging said projections, said cam plate having a peripheral surface with a number of notches into which said projections are moved during said armature ring motion, said notches being spaced at equal angles to engage said projections around a cam pitch circle concentric with said outer stator path.

2. The stepper motor of claim 1 wherein each projection includes a pin mounted to said armature ring and a roller rotatably mounted on said pin.

3. The stepper motor of claim 1:
wherein said outer stator path and inner ring path are circular;
wherein said apertures are spaced at equal angles in a circular pattern concentric with said outer stator path; and
wherein said projections are spaced at equal angles with centers of said projections being along a circle concentric with said inner ring path.

4. The stepper motor of claim 1:
wherein said outer stator path and inner ring path are circular.

5. The stepper motor of claim 1:
wherein said projections are mounted to form a projection pitch circle, and
wherein a first distance along said projection pitch circle between centers of said projections is equal to an integral multiple, including one, of a second distance along said cam pitch circle between centers of said notches.

6. The stepper motor of claim 5:
wherein said first distance is equal twice said second distance; and
wherein said notches are equal in number to one fewer than twice the number of said projections.

7. The stepper motor of claim 1 wherein each of said coils encircles one of said magnetic poles and said armature ring is a formed of a magnetic material.

8. The stepper motor of claim 1 further including driving means for supplying electrical current through individuals of said coils in a preferred sequence.

9. The stepper motor of claim 8 wherein said driving means supplies current simultaneously through pairs of adjacent coils in sequence, with current continuing to flow through a coil as a flow of current through a coil adjacent thereto in a first direction is terminated and as a flow of current through a coil adjacent thereto opposite said first direction is begun.

10. The stepper motor of claim 9:
wherein said driving means is selectably capable of supplying current in a reverse sequence, with current continuing to flow through a coil as a flow of current through a coil adjacent thereto opposite said first direction is terminated and as a flow of current through a coil adjacent thereto in said first direction is begun; and
wherein said driving means is selectably capable of supplying a current through an adjacent pair of coils.

11. The stepper motor according to claim 1 wherein said cam shape mimics the path of a point on one of said projections as said armature moves around said stator assembly.

12. Apparatus for providing incremental rotation of a drive shaft, said apparatus comprising:
a drive plate rotating with said drive shaft, said drive plate including a plurality of apertures, each aperture having a drive side;
a stator, including a peripheral stator interface;
an armature ring fitting loosely around said peripheral stator interface;
a plurality of axially directed projections attached to said armature ring, said projections being aligned with and extending individually through said apertures; and
drive means for moving said armature ring into engagement with said peripheral stator interface at an engagement point by narrowing a gap between said armature ring and said stator at said engagement point, said engagement point moving around said stator in incremental rotations; and
a stationary cam plate engaging said projections, said cam plate having a peripheral surface which mimics the path of a point on one of said projections as said armature ring moves around said stator assembly.

13. The apparatus of claim 12:
wherein said armature ring is formed from a magnetic material;
wherein said stator has a central core, a plurality of magnetic poles extending radially outward from said central core, and a coil surrounding each of said magnetic poles; and
wherein said drive means provides current through individual ones of said coils in a preferred sequence.

14. The apparatus of claim 13:
wherein said drive means provides current simultaneously through adjacent ones of said coils to form poles of opposite magnetic polarity extending outward from said central core; and
wherein said drive means selectively supplies current simultaneously through pairs of adjacent coils in sequence, such that current continuing to flow through one coil as current flow through an adjacent coil is terminated and current flow through another adjacent coil is begun.

15. The apparatus of claim 14 wherein said drive means is selectively operated to continually supply current through an adjacent pair of coils.

16. The apparatus of claim 14 wherein said peripheral stator interface includes peripheral surfaces of said magnetic poles.

17. The apparatus of claim 12:
wherein said apertures are angularly spaced at constant angles around a center of rotation of said drive plate; and
wherein said projections are angularly spaced at constant angles such that centers of said projections along a projected pitch circle are concentric with an inner cylindrical surface of said armature ring.

18. The apparatus of claim 17 wherein said cam peripheral surface has a plurality of notches into which said projections move as said armature ring is moved into engagement with said peripheral stator interface as said engagement point moves around said stator.

19. The apparatus of claim 18 wherein said notches are equal in number one less than an integral multiple of said projections.

20. The apparatus of claim 19 wherein a rotational speed developed within said armature ring as said drive means moves said engagement point around said stator, with said armature ring in rolling contact with peripheral surfaces of said stator, is equal to a rotational speed developed by engagement of said projections with said notches.

21. The stepper motor according to claim 12 wherein the motion of said path of a point on one of said projections is independent of external loads.

22. Electrical apparatus comprising:

a first plurality of magnetic stators forming a second plurality of magnetic poles extending individually outward from a central core of each stator to form a portion of a peripheral stator surface at an outer stator diameter;

a coil surrounding each of said poles;

an armature ring for each stator, each armature ring fitting loosely around one of said stators, each armature ring having an inner ring diameter greater than said outer stator diameter, each of said armature rings being movable with simultaneous rotational motion and orbital motion around each stator as said coils are sequentially energized;

a rotatably mounted drive shaft; and motion transfer means for transferring said orbital and rotational motion from each of said armature rings to said drive shaft, said motion transfer means including a drive plate mounted to turn with said drive shaft, said drive plate including a plurality of apertures; and a plurality of projections from said armature ring, each projection extending individually into an aperture, said apertures being sized to permit said rotational motion within said apertures, and a stationary cam plate engaging said projections, said cam plate having a peripheral surface with a number of notches into which said projections are moved during said armature ring motion, said notches being spaced at equal angles to engage said projections around a cam pitch circle concentric with said peripheral stator surface.

23. The electrical apparatus of claim 22 further including driving means for supplying electrical current through individual ones of said coils in preferred sequences, with current being simultaneously supplied to a first coil in a first stator and to a coil in a second stator diametrically opposite said first coil.

24. The electrical apparatus of claim 22 wherein said apparatus includes:

two inner stators and two outer stators with corresponding armature rings; and driving means for supplying electrical current through individual ones of said coils in preferred sequences, with current being simultaneously supplied to a first coil in each of said inner stators, and to a coil in each of said outer stators diametrically opposite said first coil.

* * * * *